United States Patent [19]

Pidgeon, Jr. et al.

[11] Patent Number: 5,436,749
[45] Date of Patent: Jul. 25, 1995

[54] METHOD AND APPARATUS FOR PREDISTORTION

[75] Inventors: Rezin E. Pidgeon, Jr., Atlanta; Heather H. Rand, Alpharetta, both of Ga.

[73] Assignee: Scientific-Atlanta, Inc., Norcross, Ga.

[21] Appl. No.: 805,251

[22] Filed: Dec. 9, 1991

[51] Int. Cl.⁶ .................... H04B 10/00; H04B 10/04
[52] U.S. Cl. .................. 359/161; 359/180; 359/188; 375/296; 455/303
[58] Field of Search ............... 359/161, 173, 180, 187, 359/188; 455/303-306, 3.1, 3.3; 375/60; 372/31, 33; 328/163; 327/100

[56] References Cited

U.S. PATENT DOCUMENTS

| | | | |
|---|---|---|---|
| 4,032,802 | 6/1977 | Pan | 307/311 |
| 4,045,675 | 8/1977 | Kingsley | 250/370 |
| 4,056,719 | 11/1977 | Waaben | 250/199 |
| 4,125,777 | 11/1978 | O'Brien | 250/551 |
| 4,211,979 | 7/1980 | Muraoka | 455/306 |
| 4,282,604 | 8/1981 | Jefferson | 455/602 |
| 4,316,141 | 2/1982 | Adolfsson | 324/96 |
| 4,330,764 | 5/1982 | Miedema | 455/305 |
| 4,345,482 | 8/1982 | Adolfsson | 73/862 |
| 4,378,496 | 3/1983 | Brogardh | 250/227 |
| 4,462,001 | 7/1984 | Girard | 375/60 |
| 4,561,113 | 12/1985 | Naito | 455/305 |
| 4,600,847 | 7/1986 | Baum | 455/602 |

(List continued on next page.)

OTHER PUBLICATIONS

"Predistortion Linearization of Directly Modulated DFB Lasers and External Modulators for AM Video Transmission" Childs, et al., OFC '90.

"Feasibility of Multi-Channel VSB/AM Transmission on Fiber Optic Links", J. Koscinski, *NCTA Technical Papers* (1987), p. 24.

"Linearization of Broadband Optical Transmission Systems by Adaptive Predistortion", M. Bertelsmeier, et al., *Frequenz* (1984) pp. 206–212.

"Linearization of Multichannel Analog Optical Transmitters by Quasi-Feedforward Compensation Technique", Patterson, et al., *IEEE Transactions on Communications*, vol. Com 27, No. 3 (Mar. 1979) pp. 582–588.

"Phase-Shift Modulcation Technique for the Linearisation of Analogue Optical Transmitters", Strals, et al.,
(List continued on next page.)

*Primary Examiner*—Leslie Pascal
*Attorney, Agent, or Firm*—Steven C. Stewart; Frederick W. Powers, III

[57] ABSTRACT

A predistortion circuit for an optical communications system includes a main path for an RF modulating signal and a predistortion path for a predistortion signal, which signals are combined to modulate a laser diode. The distortion path includes a distortion generator which generates a distortion signal which is substantially the same as the distortion generated by the modulation of the transmission system with the RF modulating signals. In one implementation, the distortion generator comprises a square law device which preferably is a field effect type device. The square law device operational characteristic closely mimics the major component of distortion in optical communications systems, composite second order (CSO) distortion. In a second implementation, two square law devices are coupled in an anti-phase arrangement to substantially cancel odd order distortion components from the distortion signal and to enhance even order distortion components, particularly CSO. Another implementation illustrates a dual output distortion generator which allows for the selection of either an in phase or inverted phase distortion signal to be able to compensate for sublinear and superlinear laser diode curves without a separate phase inverter. Still another implementation of the predistortion circuit provides for the independent amplitude adjustment of different bands of the CATV spectrum to permit compensation for different channel loadings, channel spacings and channel amplitudes.

1 Claim, 5 Drawing Sheets

U.S. PATENT DOCUMENTS

| | | | |
|---|---|---|---|
| 4,613,811 | 9/1986 | Vaerewyck | 324/96 |
| 4,654,891 | 3/1987 | Smith | 359/187 |
| 4,709,154 | 11/1987 | Rademaker | 250/551 |
| 4,868,895 | 9/1989 | Hershberger | 359/180 |
| 4,908,581 | 3/1990 | Honjo | 455/305 |
| 4,930,141 | 5/1990 | Ohmagari | 375/60 |
| 4,989,262 | 1/1991 | Saito | 455/305 |
| 4,992,754 | 2/1991 | Blauvelt | 328/163 |
| 5,031,235 | 7/1991 | Raskin | 359/173 |
| 5,101,456 | 3/1992 | Islam | 359/173 |
| 5,126,871 | 6/1992 | Jeffers | 359/161 |

OTHER PUBLICATIONS

*Electronics Letters*, (Mar. 3, 1977, vol. 13, No. 5) pp. 149–151.

"Analog Transmission of TV–Channels on Optical Fibers, with Non–Linearities Correction by Regulated Feedforward," Franckart, et al., ECOC 83—9th European Conference on Optical Communication, Elsevier Science Publishers B.V., North Holland (1983) pp. 347–350.

"Linearization of Light Emitting and Laser Diodes for Analog Broadband Applications by Adaptive Predistortion", Bertelsmeier, et al., Technical University, Merckstr, 25 D–6100 Darmstadt, DRF pp. 378–379.

"Nonlinearity and Its Compensation of Semiconductor Laser Diodes for Analog Intensity Modulcation Systems," Asatani, *IEEE Transaction on Communications,* (Feb. 1980), pp. 297–300.

"Linearisation of Optical Transmitters by a Quasifeedforward Compensation Technique," Straus, et al., *Electronics Letters*, (Mar. 17, 1977), vol. 13, No. 6 pp. 158–159.

"Linearization of LED Nonlinearity by Predistortions," Asatani, et al., *IEEE Transactions on Electronic Devices*, vol. ED–25, No. 2 (Feb. 1978) pp. 207–212.

"Status of 1550 nm Analog Fiber Optic systems and Performance Advantages," Pidgeon, et al., Technical Papers, SCTE Conference, Orlando, Fla. (Jan. 1991).

"Subcarrier Multiplexed Lightwave Sytem Design Considerations for Subscriber Loop Applications," Way, *IEEE Journal of Lightwave Technology*, vol. 7, No. 11 (Nov. 1989) 1809–1810.

METHOD AND APPARATUS FOR PREDISTORTION

BACKGROUND OF THE INVENTION

The invention pertains generally to the generation of a predistortion signal for a nonlinear optical transmission system and is more particularly directed to method and apparatus for the generation of a predistortion signal for compensating the nonlinearities of a semiconductor laser in an optical fiber transmission system.

Communications systems which include a semiconductor laser, an optical fiber communication link, and an optical receiver are well known in the art. These communication systems are adapted to carry a wide range of information including voice, video and data.

The typical optical communications system includes a laser transmitter which transduces an electrical information signal into an optical signal. The optical signal is then carried over an optical fiber communications link where it is converted back to an electrical signal by a photo detector of an optical receiver. The transmission scheme may be analog or digital and the modulation scheme amplitude, phase, or frequency, or any combination of the above.

One of the most advantageous optical communication systems from the viewpoint of simplicity and bandwidth considerations is an analog scheme where the optical intensity of the semiconductor laser is amplitude modulated. The transmission system, including the semiconductor laser, optionally an optical amplifier, and optical fiber communications link is required to convert the electrical information signal linearly into an optical signal and to transmit it linearly over the communications link. In general, distortions caused by this semiconductor laser, the optical amplifier, and the fiber optic communications link cause the system to operate in less than an optimum manner. Increasingly, this type of optical communications system is playing an important role in the delivery of high quality signals in all types of CATV architectures.

A cable television signal is comprised of multiple channel components which are frequency division multiplexed. Each channel has a carrier frequency on which video and audio information is modulated, usually by amplitude modulation for the video and by frequency modulation on a sub-carrier for the audio. The intermodulation distortion of this signal is usually one of the most difficult problems for the linear transmission of the signal. Intermodulation distortion produces beats at the sum and difference frequencies of the different carriers found in the CATV signal.

Composite second order (CSO) distortion in a particular channel is the total power of the separate sum and difference beats of the other channels falling within that channel. The CSO distortion is therefore a function of the number of channels in a particular system, their relative power levels, and their general spacing or location in the CATV spectrum. In general, the distortion in a typical cable television spectrum is greater at the low end of the band, decreases to a minimum at the center of the band, and thereafter increases at the high part of the band. The distortion at the low end of the band is due to the difference frequency beats of the middle and upper channels, while the distortion at the high end of the band is due to the sum frequency beats of the middle and lower channels. While the distortion is generally greater at the extremes, it is difficult to predict the amount of the difference between the greatest and least distortions, the overall distortion level, and whether the high band distortion will be greater than the low band distortion, or vice versa. Thus, it would be highly desirable to provide means for adjusting a predistortion signal to compensate for the different levels of CSO at different parts of the CATV spectrum.

SUMMARY OF THE INVENTION

The invention provides a predistortion method and apparatus for the compensation of a nonlinear optical transmission system. In one preferred embodiment, the transmission system can be used for the carriage of a broadband television signal for a CATV system. The optical transmission system includes a semiconductor laser which acts as an electrical signal to optical signal transducer and a fiber optic communications link which carries the optical signal to an optical receiver. The predistortion method and apparatus includes a distortion generator which, from an RF input modulating signal, generates a distortion signal of the same general type as the distortion inherent in the optical transmission system when modulated. For a laser diode this is LI nonlinearities, and a function of mainly second order distortion and other intermodulation effects.

The invention provides an improved predistortion network for a nonlinear transmission device. The invention is particularly adapted to compensate for the distortion caused by the modulation of a laser diode with an RF input signal with a multiplicity of carriers. When the RF modulation signal is a broadband multichannel CATV signal, the invention provides many of its advantages.

In one preferred embodiment, the invention includes a direct path and a distortion path. An RF input signal, preferably a broadband multichannel CATV signal, is split between the direct path and the distortion path. The distortion path has a distortion generator fed by a portion of the input signal to produce a distortion signal essentially equivalent to that which will be produced by the distortion caused by the modulation of the nonlinear transmission device. The distortion generated in the distortion path is then recombined with the signal in the direct path to produce a cancellation of the distortion.

According to one aspect of this embodiment, la square law device is used to generate the distortion signal from the distortion generator. A square law device closely mimics the nonlinearity of the LI curve of many laser diode devices. In the illustrated implementation of the invention, the square law device selected is a field effect transistor, such as a GaAsFET (Gallium Arsenide Field Effect Transistor), operated in the nonlinear region near pinch off. A GaAsFET is chosen because of its good high frequency characteristics across the bandwidth of interest. In addition, because it is a voltage controlled device, the operating point of the device can be varied easily and precisely to generate the distortion characteristic desired. A device to invert of the phase of the distortion signal is further provided to produce either a sublinear or superlinear response from the square law device.

In another embodiment of the invention, two of the distortion generators are utilized in a configuration which permits the cancellation of the fundamental frequency and the composite triple beat (CTB) component of the distortion. A triple beat is where three fundamental combine such as (f1+f2+f3), (f1+f2−f3), etc. and CTB is the composite of all the beat frequencies falling in the channels for a particular range of frequencies. Preferably, the two distortion generators comprise square law devices which are field effect devices where the two devices are fed 180° out-of-phase from each other and have their outputs connected in parallel.

Another preferred implementation includes the provision of a plurality of distortion generators, where at least one of the distortion generators produces a controllable amplitude of distortion signal for a low band of the CATV spectrum as defined by the pass band of a low pass filter. At least one other distortion generator produces a controllable amplitude of distortion signal for a high band of the CATV spectrum as defined by the pass band of a high pass filter. The two bands are independently adjustable to compensate for the different distortion amplitudes based on the number of channels, channel power levels, and channel placements in a CATV system.

BRIEF DESCRIPTION OF THE DRAWINGS

These and other objects, features and aspects of the present invention will be better understood from a reading of the following detailed description in conjunction with the drawings in which.

DETAILED DESCRIPTION OF THE PREFERRED EMBODIMENTS

Figure 1:
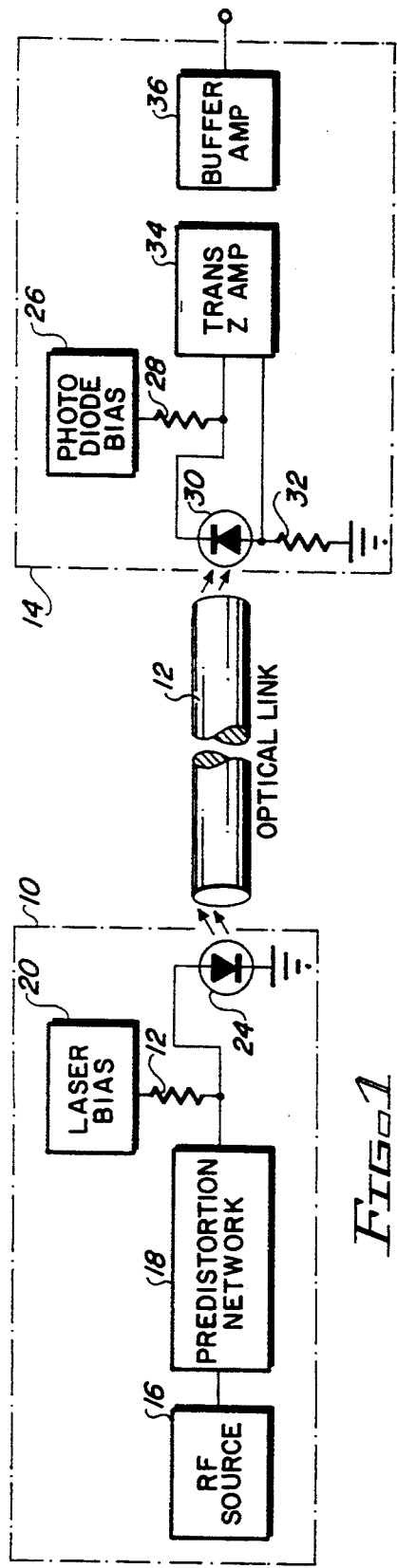
FIG. 1 is a system block diagram of an optical communications system having a predistortion circuit for the laser of an optical transmitter which is constructed in accordance with the invention.

With reference now to the drawings, FIG. 1 is a system block diagram of an optical communications system constructed in accordance with the invention. The optical communications system comprises an optical transmitter 10 which transmits over an optical communication link 12, generally an optical fiber, to an optical receiver 14. The optical transmitter 10 has an RF source 16 which provides an RF modulation signal to a laser diode 24. The modulation signal, preferably a broadband CATV signal, modulates the optical intensity of the output of the laser diode 24 by varying the bias current to the diode from a laser bias source 20 through a current limiting resistor 22. The light output from the laser diode 24 is then coupled to the optical link 12 for transmission to the optical receiver 14. Before the RF modulation signal is applied to the laser diode 24, it is sampled and processed by a predistortion network 18. The predistortion network 18 generates a predistortion signal of substantially the same amplitude, phase, and frequency of the distortion generated by the nonlinear modulation process. By modulating the laser diode 24 with both the RF modulation signal and the predistortion signal, the distortion caused by the transmission process may be substantially canceled and the system linearized.

The optical receiver 14 includes a photo detector 30, for example, a PIN photodiode which transduces the intensity modulated optical signal into an amplitude modulated electrical current signal. The photo detector 30 is generally reversed biased by a second photodiode bias source 26 through current limiting resistors 28 and 32. Differential current signals are then taken from the anode terminal and cathode terminal of the photo detector 30 for input to a transimpedance amplifier 34. The amplifier 34, which may have a push-pull configuration, transforms the electrical current signal into an RF amplitude modulated voltage signal similar to that from the RF source 16 at the transmitter 10. This AM signal is then amplified to a suitable level by a buffer amplifier 36 and output for further processing, or for direct distribution to a multiplicity of CATV subscribers.

The predistortion network 18 compensates for the nonlinearities of the transmission system which includes the laser diode 24. The distortions most prevalently caused by the laser diode 24 are the LI nonlinearities, second order and other intermodulation products.

Figure 2:
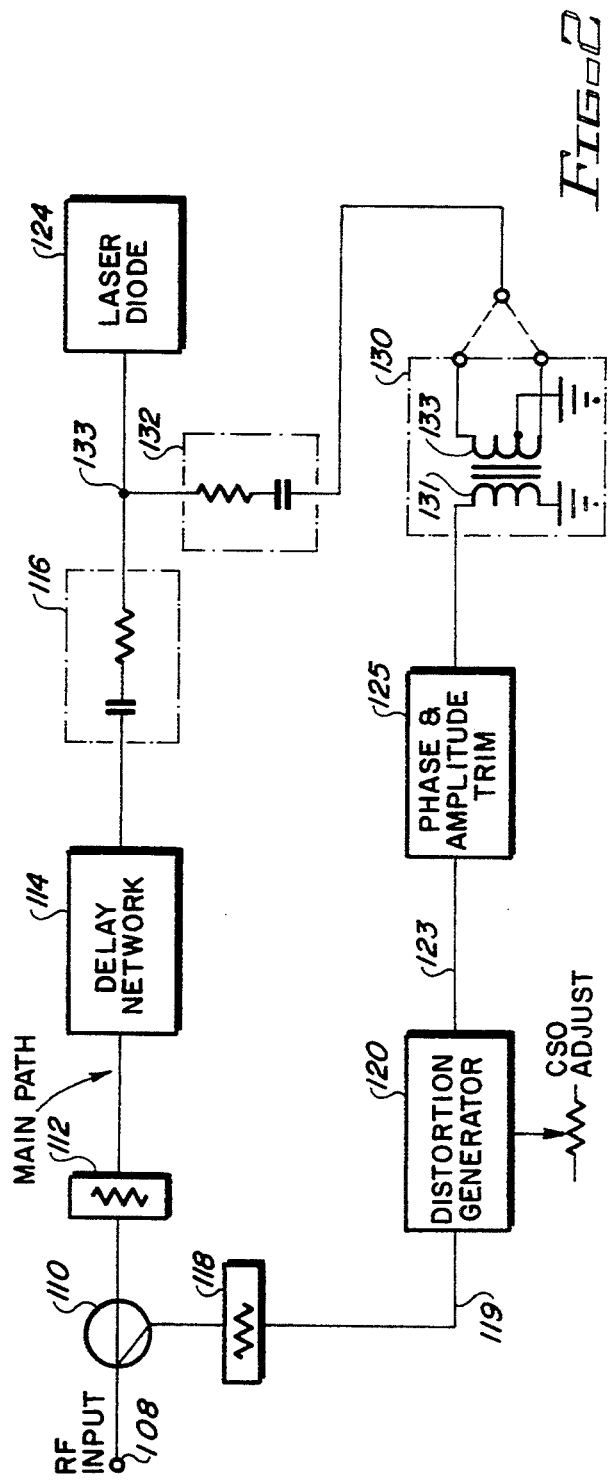
FIG. 2 is a functional block diagram of a first embodiment of the predistortion circuit illustrated in FIG. 1.

FIG. 2 is a block diagram of the predistortion network 18 illustrated in FIG. 1 where the network is connected to the RF source 16 at terminal 108 and feeds the laser diode 24 at terminal 133. The RF modulating signal is split into two paths by a directional coupler 110 with most of the power of the signal being transmitted through a main path and a much smaller portion being transmitted through a distortion path. The main path comprises a plug-in resistor pad 112, a delay network 114, and a matching network 116. The resistor pad 112 sets the level of the RF modulating signal in the main path for a desired modulation index for the laser diode 24. The delay network 114, which can be a predetermined length of coaxial cable, is used for delaying the main path signal by substantially the same amount of time caused by the transit of the RF modulation signal through the distortion path. The matching network 116 matches the output impedance of the delay network 114 and main path to the low input impedance of the laser diode 24.

The distortion path comprises a plug-in resistor pad 118, a distortion generator 120, distortion signal adjustment networks 123, a phase selector 130, and a matching network 132. The pad 118 is used to set the level of the sample of the RF modulation signal such that the distortion path will provide a distortion signal of substantially the same magnitude as the distortion caused by the modulation of the transmission system. The distortion generator 120 then distorts the sample of the input modulation signal in a similar manner as the system will distort it during the modulation process.

Adjustments to the phase and amplitude of the distortion signal as a function of frequency are made with the adjustment networks 123. Transformer 131 is used by the phase selector 130 to apply the correct sense or phase of the distortion signal to correct for either sublinear or superlinear laser diode curves. The correct sense of the distortion signal is selected by jumpering the particular terminal of the center tapped secondary 133 of the transformer 131. The matching network 132 matches the output impedance of the network 123 and phase selector 130 to the low input impedance of the laser diode 24.

Figures 3, 4:
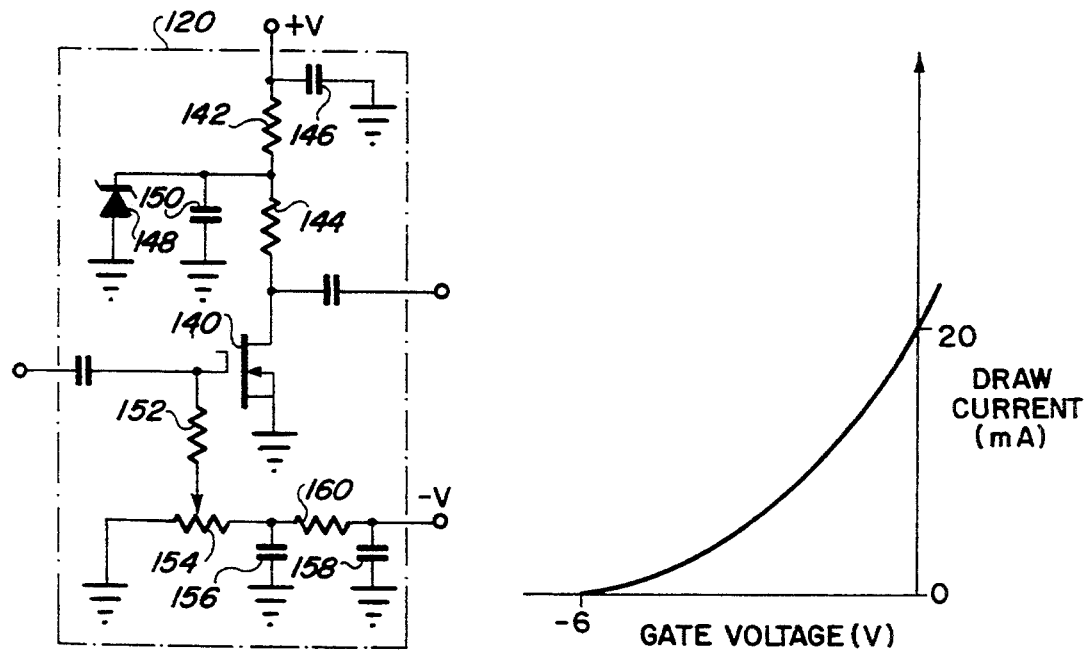
FIG. 3 is a detailed electrical schematic diagram of a first implementation of the distortion generator illustrated in FIG. 2.
FIG. 4 is a graphical representation of the operating characteristics of the GaAsFET illustrated in FIG. 3.

FIG. 3 is a detailed schematic of a first implementation of the distortion generator using a square law device, such as a field effect device biased near a pinch off. The field effect device illustrated is a GaAsFET 140 which has an operating characteristic generally shown in FIG. 4. In the grounded source configuration shown, the device 140 operates as a voltage controlled current device which has a load line defined by load resistors 142, 144 and the voltage source $+V$. The quiescent operating point is defined by the voltage applied to the gate terminal by the voltage divider network of resistors 152, 160 and potentiometer 154. The potentiometer 154 selects the particular bias point of FIG. 4 and allows the distortion signal to be adjusted. By biasing the GaAsFET 140 near pinch off, a response similar to the square law distortion of a laser diode can be generated. The GaAsFET is selected because of its highly nonlinear pinch off region, common in many FETS, and its excellent high frequency characteristics across the CATV spectrum. The device is also precisely controllable to be able to tailor the distortion generated by the gate voltage. FIG. 4 illustrates an N-channel depletion region type FET, but most FETs have a nonlinear region of their operating drive which is of use.

When generating CSO with a single square law device, such as a FET, the fundamental frequencies of the input RF signal and the composite triple beat (CTB) generated by the distortion generator are still included in the distortion signal. For the most optimum cancellation of distortion, these fundamental and CTB components should be reduced with respect to CSO or nulled altogether. The distortion generator 120 illustrated in FIG. 5 accomplishes this function in an advantageous manner. In general, two square law devices 202, 206, preferably two GaAsFET devices, are fed out of phase with the RF input signal from an inverter 200. The outputs are combined in parallel such that the even ordered distortion components add and the odd ordered distortion components cancel. Because the most significant even ordered component is CSO, it is reinforced significantly. The most significant odd ordered components in the signal are the fundamental and CTB components, which are canceled or substantially attenuated frequencies. Independent adjustments 204, 206 for the CSO of the devices allow a substantial cancellation or an adjustable amount of odd ordered distortion components in the distortion signal. The processed distortion signal is the input to a resistive level setting network 210 and then to an amplifier 212 where the overall level of CSO can be adjusted by adjustment network 214. The level is then equalized and impedance matched by network 216 before being output.

Figure 5:
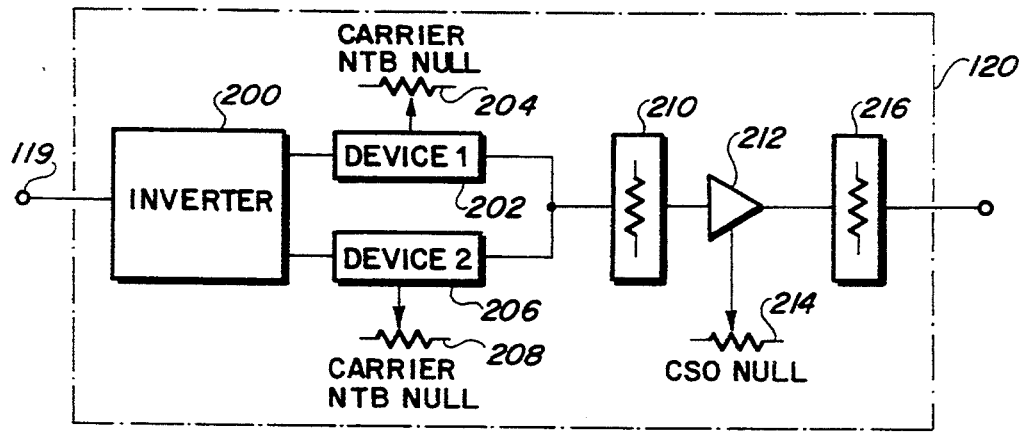
FIG. 5 is a detailed block diagram of a second implementation of the predistortion generator illustrated in FIG. 2.
Figure 6:
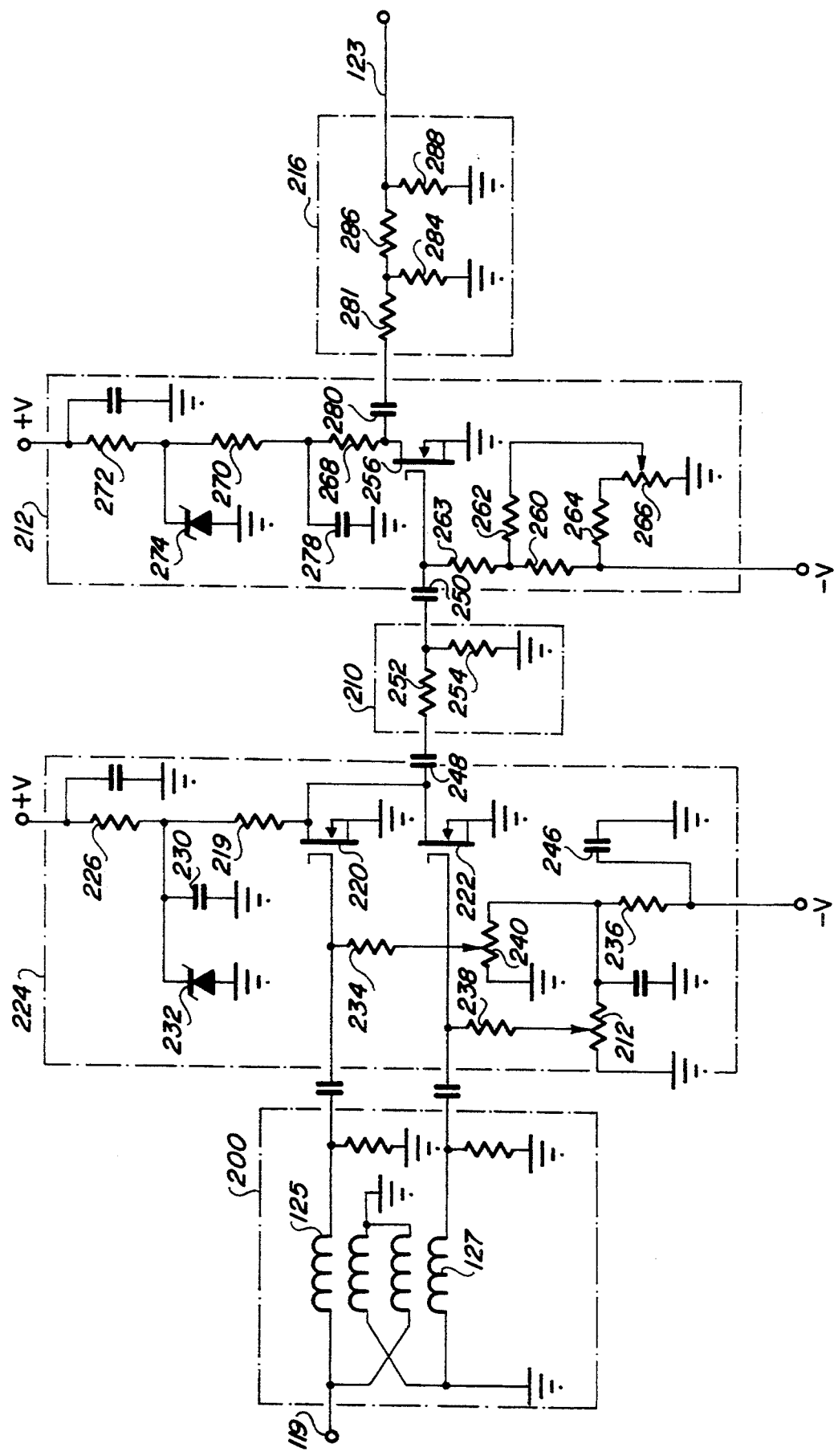
FIG. 6 is a detailed electrical schematic of the distortion generator illustrated in FIG. 5.

The specific implementation of the distortion generator 120 shown in FIG. 5 using a plurality of square law devices to provide fundamental frequency and CTB suppression in the distortion signal is illustrated in FIG. 6. The distortion generator 120 in this implementation basically comprises two GaAsFETS 220, 222 which are connected as grounded source devices with a common drain bias network 224. The drain bias network consists of resistors 226, 228 connected between the positive supply voltage $+V$ and the common connection of the drain terminals. A capacitor 230 and Zener diode 232 are connected between the junction of resistors 226, 228 and ground. The Zener diode 232 protects against over voltages at the drain terminal. The capacitor 230 and a capacitor 234, connected between the power supply voltage $+V$ and ground, decouple the resistor 226 and power supply $+V$ from the RF signal.

The drain current for each square law device 220, 222 is variable with respect to the voltage applied to its gate terminal. A gate bias circuit comprising resistors 234, 236 and 238, potentiometers 240, 242 and capacitors 244, 246 provide independently adjustable gate voltages for the GaAsFETS 220, 222. Resistor 234 and potentiometer 240 form one voltage divider network and are connected to resistor 236 which is, in turn, connected to the negative voltage source $-V$. The resistor 234, which is also connected to the gate terminal of GaAsFET 220, applies a voltage set by the potentiometer 240 to that terminal. Similarly, resistor 238 and potentiometer 242 form another voltage divider network and are additionally connected to the resistor 236. The resistor 230, which is also connected to the gate terminal of GaASFET 222, applies the voltage set by the potentiometer 242 to that gate terminal. The capacitors 244, 246 decouple the resistor 236 and power supply $-V$ from the RF signal. By adjusting the potentiometers 242, 244 so that the bias current through each of the GaAsFETS 220, 222 is the same, the odd order distortion components of the distortion signal can be substantially canceled. Basically, this cancels the odd order components comprising the fundamental frequencies and the CTB.

Once the distortion signal has been enhanced for even ordered distortion components, it is passed through coupling capacitors 248, 250 and its level set by a resistive divider network comprising resistors 252, 254. The distortion signal with enhanced even ordered distortion components is then input to the gate of a grounded source amplifier comprising GaAsFET 256. The gain of the amplifier, and as a consequence the level of the distortion signal, is adjusted by a resistive network comprising resistors 258-264 and potentiometer 266. Basically resistors 258, 260 form a voltage divider network which vary the voltage to the gate by means of potentiometer 266. The source of the GaAsFET 256 256 is grounded and the drain is provided with a bias circuit comprising resistor 268, inductor 270 and resistor 272 connected between the drain terminal and the source of positive voltage $+V$. A Zener diode 274, which is connected between the junction of resistor 276 and inductor 270 limits the voltage applied to the source terminal while capacitors 276, 278 decouple the power supply +V and bias circuitry respectively from the RF signal. The level adjusted distortion signal which has the enhanced for second order distortion components is passed through coupling capacitor 280 to a resistive equalization network comprising resistors 282–288. The resistive equalization network matches the output impedance of the GaAsFET 256 to the phase and amplitude trim or to the output transformer.

Figure 7:
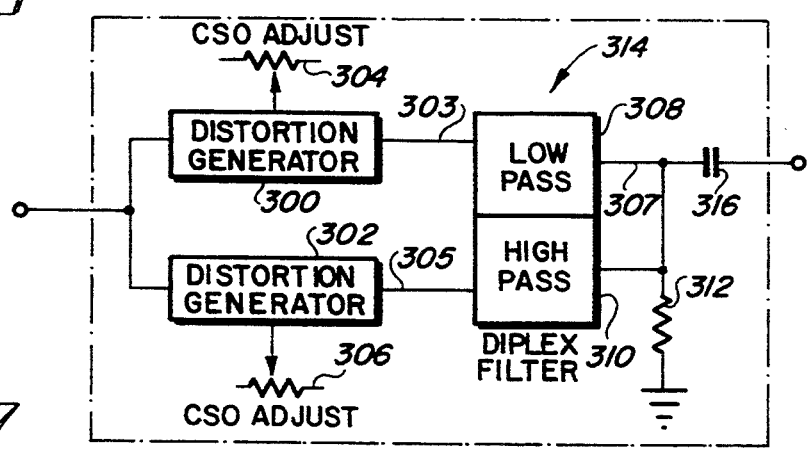
FIG. 7 is a detailed block diagram of a third implementation of the predistortion generator illustrated in FIG. 2 showing independent adjustments for different ranges of the CATV spectrum.

A third implementation of the distortion generator 120 is shown in FIG. 7. The implementation shows a plurality of distortion generators which can include either of the two types previously described. The distortion generators 300, 302 feed a filter section comprising a diplex filter 314 having a low pass filter 308 for one portion of the CATV band, and a high pass filter 310 for another portion of the CATV band 320. The outputs of the low pass filter 308 and the high pass filter 310 are combined at a resistor 312 and then fed through a coupling capacitor 314 for output. The separate distortion generators 300, 302 which are assigned to different parts of the CATV band have adjustments 304, 306 (CSO adjust), which allow the distortion levels generated to be independent of the other band. This feature allows the amplitude of the distortion signal to compensate for different channel numbers, channel power levels, and channel placements in a more facile manner. It is evident, rather than providing multiple distortion generators to split the output of one.

Figure 8:
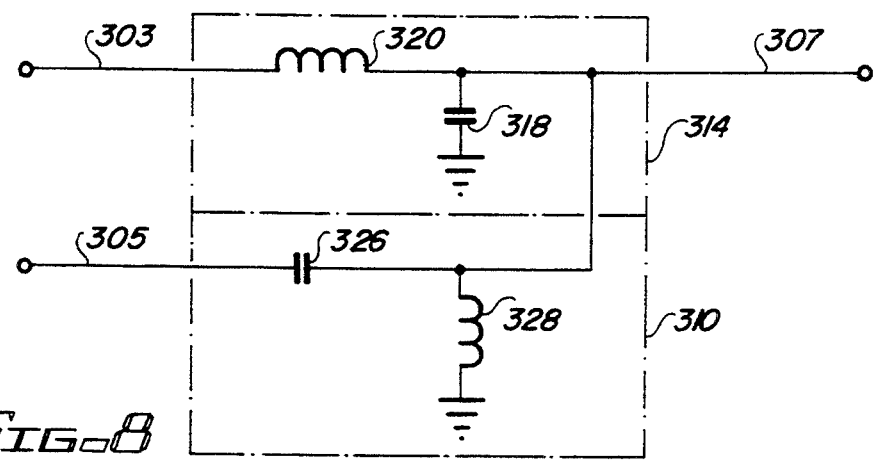
FIG. 8 is a detailed circuit diagram of the diplex filter illustrated in FIG. 7.

A specific example of the low pass filter 308 and high pass filter 310 of the diplex filter 314 is shown in FIG. 8. The low pass filter 308 is preferably a network of a capacitor 322 and an inductor 320. The generalized frequency response, determined by the values of the particular components, is shown in FIG. 9B as curve 330. The high pass filter 310 is preferably a network of an inductor 324 and a capacitor 326. The generalized frequency response, determined by the values of the particular components, is shown in FIG. 9B as curve 332.

Figure 9A:
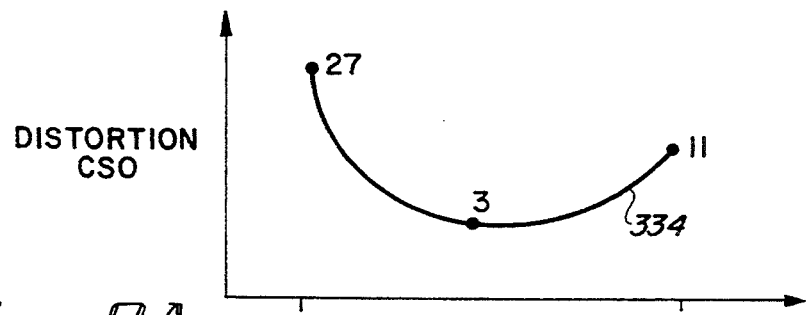
FIG. 9A is a graphical representation of actual distortion as a function of frequency for the CATV spectrum.
Figure 9B:
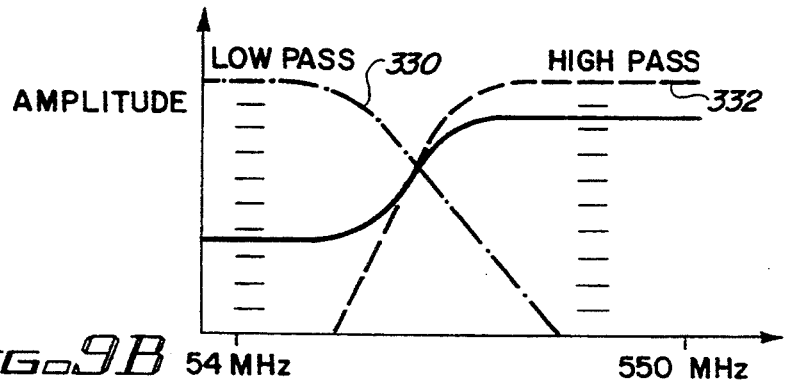
FIG. 9B is a graphical representation of the amplitude versus frequency response of the distortion generator illustrated in FIG. 7.

The amplitude adjustment of the distortion signal provided by the dual distortion generators with the diplex filter will now be more fully explained with respect to FIGS. 9A and 9B. Typically, CSO as a function of frequency over the CATV spectrum appears as curve 334 in FIG. 9A. This curve is a general shape and its actual parameters change with channel power levels, channel placements, and number of channels. As an example, for a particular CATV system it was found there were 27 beats at the low frequency, 3 beats at the mid frequency, and 11 beats at the high frequency. The distortion because of the difference frequency beats of the middle and higher channels is found at the lower channels of the spectrum. The distortion because of the sum frequency beats of the lower and middle channels is found at the higher channels of the spectrum. The relative magnitude of the distortion and whether the low channel distortion is greater than the high channel distortion may vary.

The invention provides a facile solution to this problem by splitting the CATV spectrum into at least two ranges and generating CSO in each range with an independent amplitude adjustment. This allows the two ends of the spectrum to be easily compensated by the amplitude adjustment to either the high pass filter characteristic 332 for the high channels, or the low pass filter characteristic 330 for the low channels, with essentially a neutral adjustment in the mid range channels as shown in FIG. 9B. The various amplitude versus characteristics for each band can be independent to form an infinite family of composite curves which can be tailored to the particular CATV with different channel power levels, channel placements, and channel numbers such as response 333. While only two bands or ranges have been shown, it is also evident the multiple ranges can be used to produce specific tailoring for other distortion.

Figure 10:
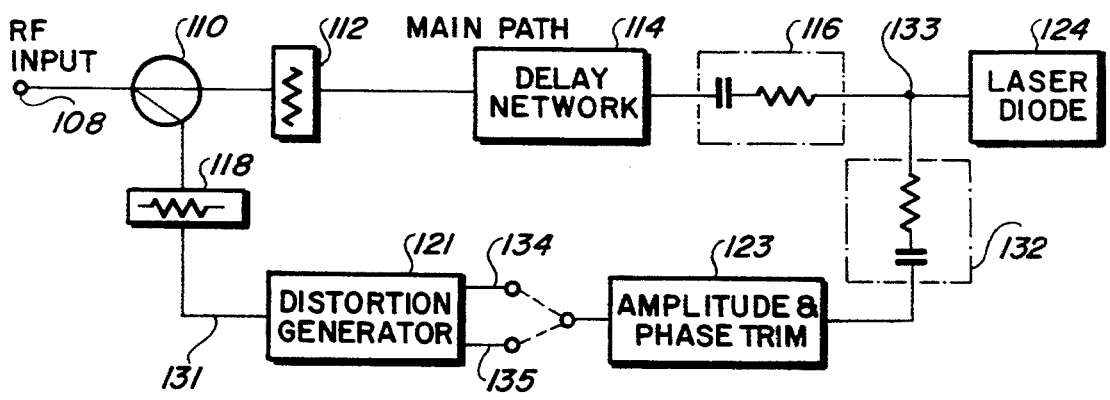
FIG. 10 is a functional block diagram of a second embodiment of the predistortion circuit illustrated in FIG. 1.

FIG. 10 illustrates a block diagram of a second embodiment of the predistortion network illustrated in FIG. 1. The predistortion network includes a direct path for the RF input signal through a delay network and a distortion path comprising a distortion generator. The embodiment is substantially similar to that illustrated in FIG. 2 except the distortion generator 121 has replaced the distortion generator 120 and phase selector 130 has been eliminated. The distortion generator 121 has dual outputs which provide the distortion signal and an inverted version of the distortion signal permitting a superlinear or sublinear correction without the need of an additional phase selector network. The correct phase of the distortion signal is chosen by jumpering the correct version of the distortion signal to the input of the adjustment networks 123.

In addition, a preferred implementation of one of the distortion generators which has a dual output which generates either the distortion signal or an inversion of the distortion signal. The dual outputs of the distortion generator provides the choice of superlinear or sublinear distortion for each part of the band by the selection of the jumpers.

Figure 11A:
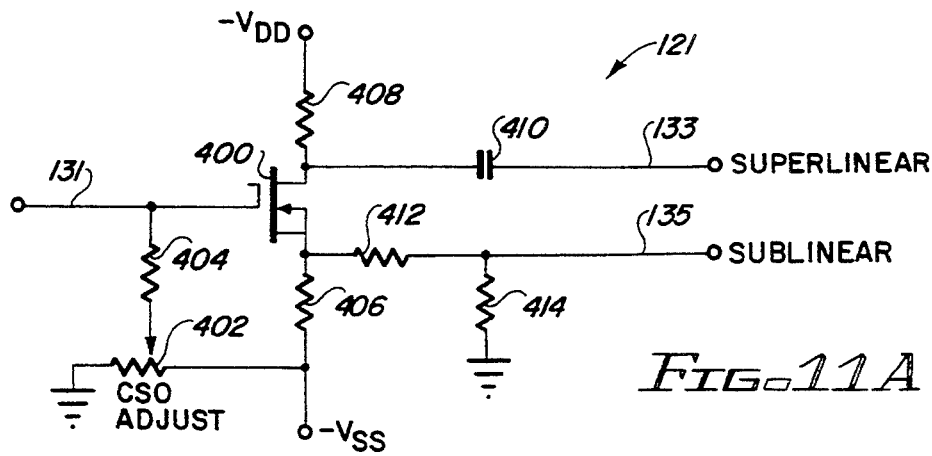
FIG. 11A is a detailed electrical diagram of a first embodiment of the distortion generator illustrated in FIG. 10.

The dual output amplifier 121 will now be more fully described with respect to FIG. 11A. The distortion generator 121 comprises an N channel GaAsFET 400 which has an adjustable gate voltage produced by the variation of a potentiometer 402 connected between a negative source voltage, −Vss and ground. A controlled drain current is provided by the connection of load resistors 406, 408 between the source voltage −Vss and the source terminal, and the drain voltage +Vdd and the drain terminal, respectively. A distortion signal according to the square law response of the GaAsFET 400 is generated 180° out of phase of the input signal, and output from the drain terminal through coupling capacitor 410 to compensate for superlinear LI curves. Alternatively, a distortion signal according to the square law response of the GaAsFET 400 is generated in phase with the input signal, and output at the junction of the dividing network comprising resistors 412, 414 to compensate for sublinear LI curves.

Figure 11B:
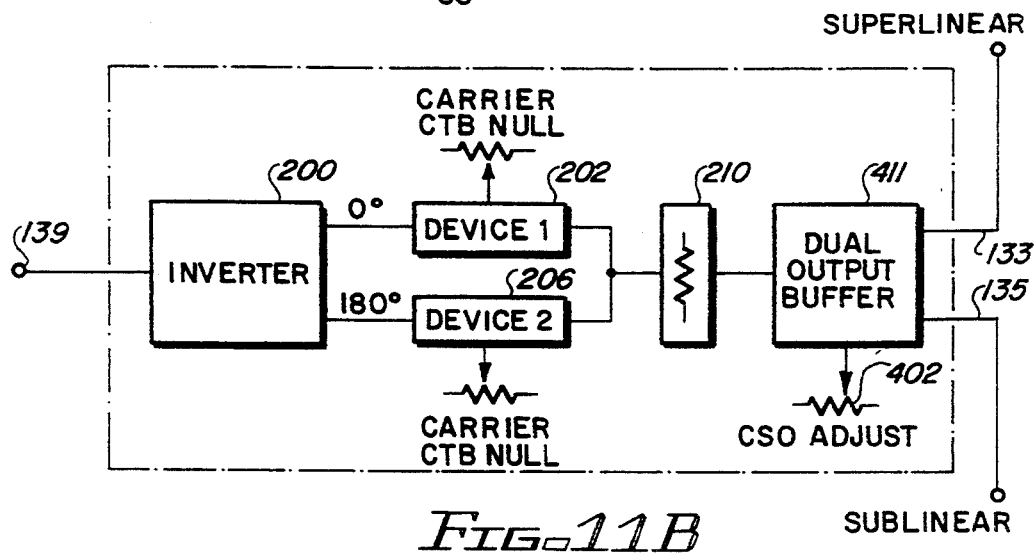
FIG. 11B is a detailed block diagram of a second embodiment of the distortion generator illustrated in FIG. 10.

In FIG. 11B, the dual output amplifier 41 of FIG. 11A can be used as a buffer amplifier for the distortion generator embodiment illustrated in FIG. 5. Advantageous, the configuration in FIG. 11B illustrates a dual output distortion generator which does not need an independent inversion circuit. Moreover, it includes the advantages of using a square law device while enhancing the CSO distortion component and suppressing odd order components.

Figure 12:
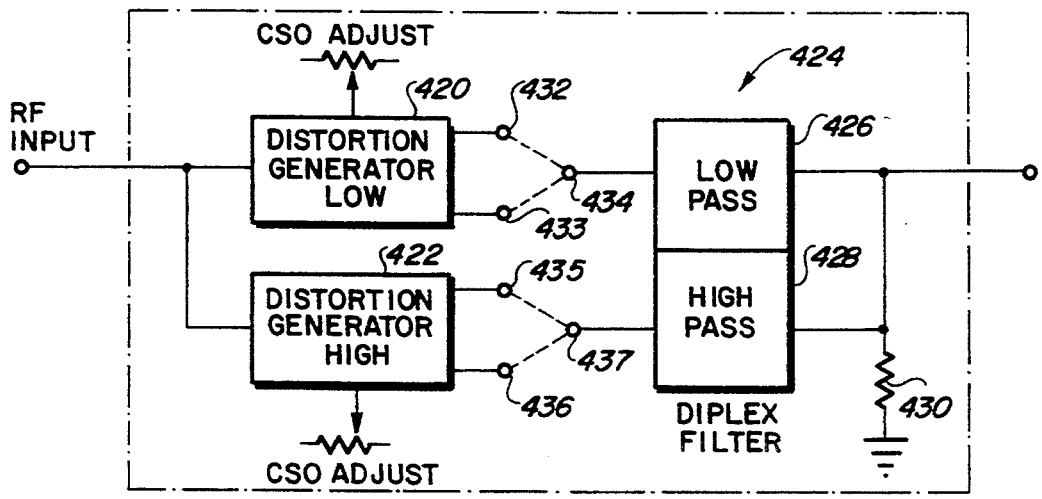
FIG. 12 is a detailed block diagram of a second implementation of the distortion generator illustrated in FIG. 10.

Still another embodiment of the invention can be used to advantage in the configuration of the invention shown in FIG. 12. The figure illustrates a distortion generator 121 which can be directly substituted for the distortion generator of the embodiment of the predistortion circuit shown in FIG. 10. The distortion generator 121 uses the dual distortion generator and diplex filter configuration of FIG. 7. In addition, each distortion generator 420, 422 has a dual output and preferably is the type of distortion generator illustrated in FIG. 11. This embodiment provides the advantages of providing multiband adjustment for the distortion signal while also eliminating the phase selection transformer.

While there has been shown and described the preferred embodiments of the invention, it will be evident to those skilled in the art that various modifications may be made thereto without departing from the spirit and scope of the invention as is set forth in the appended claims.

What is claimed is:

1. A predistortion circuit for a nonlinear optical transmission system including a nonlinear device and having a main path and a distortion path, said predistortion circuit comprising:

means for dividing an RF input signal into the main path and the distortion path;

means, located in the distortion path, for generating a distortion signal from the RF input signal which includes a square law device;

means for adjusting the amplitude and the phase of the distortion signal;

means, coupled to said distortion generating means, for selecting the adjusted distortion signal or an inversion of the adjusted distortion signal; and means for combining the selected adjusted distortion signal from the distortion path and the RF input signal from the main path for modulation of the nonlinear device.

* * * * *